US006983990B2

(12) United States Patent
McMillen

(10) Patent No.: US 6,983,990 B2
(45) Date of Patent: Jan. 10, 2006

(54) DUAL DRIVE POWER ACTUATOR

(75) Inventor: Robert J. McMillen, Tecumseh (CA)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/770,940

(22) Filed: Feb. 3, 2004

(65) Prior Publication Data

US 2005/0168027 A1     Aug. 4, 2005

(51) Int. Cl.
  *A47C 3/00*     (2006.01)
  *B60N 2/02*     (2006.01)
(52) U.S. Cl. .............................. 297/284.4; 297/284.7; 297/284.8
(58) Field of Classification Search ................ 74/664, 74/665 GB, 665 GC, 665 G, 665 P, 661, 74/405, 414, 423; 297/284.4–284.8
  See application file for complete search history.

(56) References Cited

U.S. PATENT DOCUMENTS

| | | | | |
|---|---|---|---|---|
| 1,082,105 A | * | 12/1913 | Anderson ..................... 74/405 |
| 2,947,201 A | * | 8/1960 | Sigvard ....................... 475/295 |
| 3,888,138 A | * | 6/1975 | Hiersig .................. 74/665 GC |
| 3,999,241 A | * | 12/1976 | Mafnas ..................... 15/250.21 |
| 4,131,776 A | * | 12/1978 | Ehrenberger ................. 74/405 |
| 5,197,780 A | | 3/1993 | Coughlin .................. 297/284.7 |
| 5,213,010 A | * | 5/1993 | Hayafusa et al. ...... 74/665 GA |
| 5,217,278 A | | 6/1993 | Harrison et al. ......... 297/284.7 |
| 5,319,418 A | * | 6/1994 | Fujimoto et al. ...... 74/665 GC |
| 5,638,722 A | | 6/1997 | Klingler ..................... 74/502.4 |
| 5,819,631 A | * | 10/1998 | Denney ........................ 83/874 |
| 6,050,641 A | | 4/2000 | Benson ..................... 297/284.4 |
| 6,053,064 A | | 4/2000 | Gowing et al. ............. 74/89.15 |
| 6,338,530 B1 | * | 1/2002 | Gowing ................... 297/284.4 |
| 6,666,103 B2 | * | 12/2003 | Gotoh .......................... 74/414 |
| 2003/0106970 A1 | | 6/2003 | McMillen ................... 248/161 |

FOREIGN PATENT DOCUMENTS

| | | | |
|---|---|---|---|
| DE | 10238440 | | 9/2003 |
| DE | 10247703 | | 4/2004 |
| JP | 57173656 A | * | 10/1982 |
| JP | 06183275 A | * | 7/1994 |
| WO | WO 0174620 | | 10/2001 |

OTHER PUBLICATIONS

PCT International Search Report and The Written Opinion of the International Searching Authority, or the Declaration dated Jul. 6, 2005.

* cited by examiner

*Primary Examiner*—Peter M. Cuomo
*Assistant Examiner*—Stephen D'Adamo
(74) *Attorney, Agent, or Firm*—Husch & Eppenberger LLC; Grant D. Kang; Dennis J. M. Donahue, III

(57) ABSTRACT

A dual drive actuation system includes a driver gear, a pair of actuators with driven gears, and a transmission for switching the driver gear between the pair of actuators. The transmission can be controlled by a solenoid, and the driver gear can be powered by a motor. The dual drive actuation system can be used with different actuators that are changed based on their required usage, sizing and range of motion.

20 Claims, 8 Drawing Sheets

DUAL DRIVE POWER ACTUATOR

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

This invention relates generally to actuators for ergonomic systems and, more particularly, to actuator systems for seat adjustments.

2. Related Art

Ergonomic supports for seats, such as lumbar and bolster systems, are typically moved by means of actuators that can be operated by hand or driven by a motor. Four-way power lumbar devices, with an arching mode and a translation mode, have traditionally required a motor for each mode of operation. In comparison, the invention set forth by U.S. Pat. No. 6,050,641 is a four-way power lumbar system that requires only a single-motor and reduces the duplication of gearbox components. Prior to this invention, U.S. Pat. Nos. 5,197,780 and 5,217,278 had only described four-way lumbar devices that were manually operated by a single control knob.

While these devices are an improvement over the conventional four-way lumbar devices that required multiple motors or multiple control knobs, the highly competitive markets for furniture and automotive seats place a premium on continued optimization of devices that provide comfort and convenience for seat occupants. In particular, there is a need for improved actuation systems that are less prone to failures and more efficiently transfer power to the actuators. For example, with regard to the manually-operated four-way lumbar systems, the gearing systems are inefficient because, in addition to the gears, they have a transmission that requires at least one non-gear alignment device to maintain the proper engagement between the driver gear and the driven gears. Therefore, such devices have an alignment device that is necessary for the convenient operation of the lumbar system and increase the potential for a failure in the system.

Additionally, there is a need for actuation systems that are more modular, increasing the commonality of parts between two-way and four-way power lumbar devices, manually-operated and motor-driven actuation systems, and lumbar systems and bolster systems. For example, the prior art actuation units and driven gears are designed to fit within a single housing along with the driver gears and the transmission system, thereby limiting the range of motion that is capable for the actuation units themselves. Different types of lumbar devices and bolster devices are typically designed to provide different levels of support and often require different levels of actuation, thereby affecting the size of the actuators. The prior art devices do not easily allow for changing the actuators according to various sizing requirements, and the confined housing could prevent the same actuation system from being used for different lumbar devices or for a lumbar device and a bolster device. Therefore, entirely different actuation systems would need to be designed, and separately manufactured, depending on the actuators' usage, range of motion, and sizing.

SUMMARY OF THE INVENTION

It is in view of the above problems that the present invention was developed. The invention is a dual drive actuation system that can combine existing two-way manual actuators with a gearing system to switch between multiple actuators. Additionally, the dual drive actuation system can be powered by a motor, and a solenoid can be used to switch the gearing system between the actuators. The dual drive actuation system can be used with different actuators that are changed based on their required usage, sizing and range of motion.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
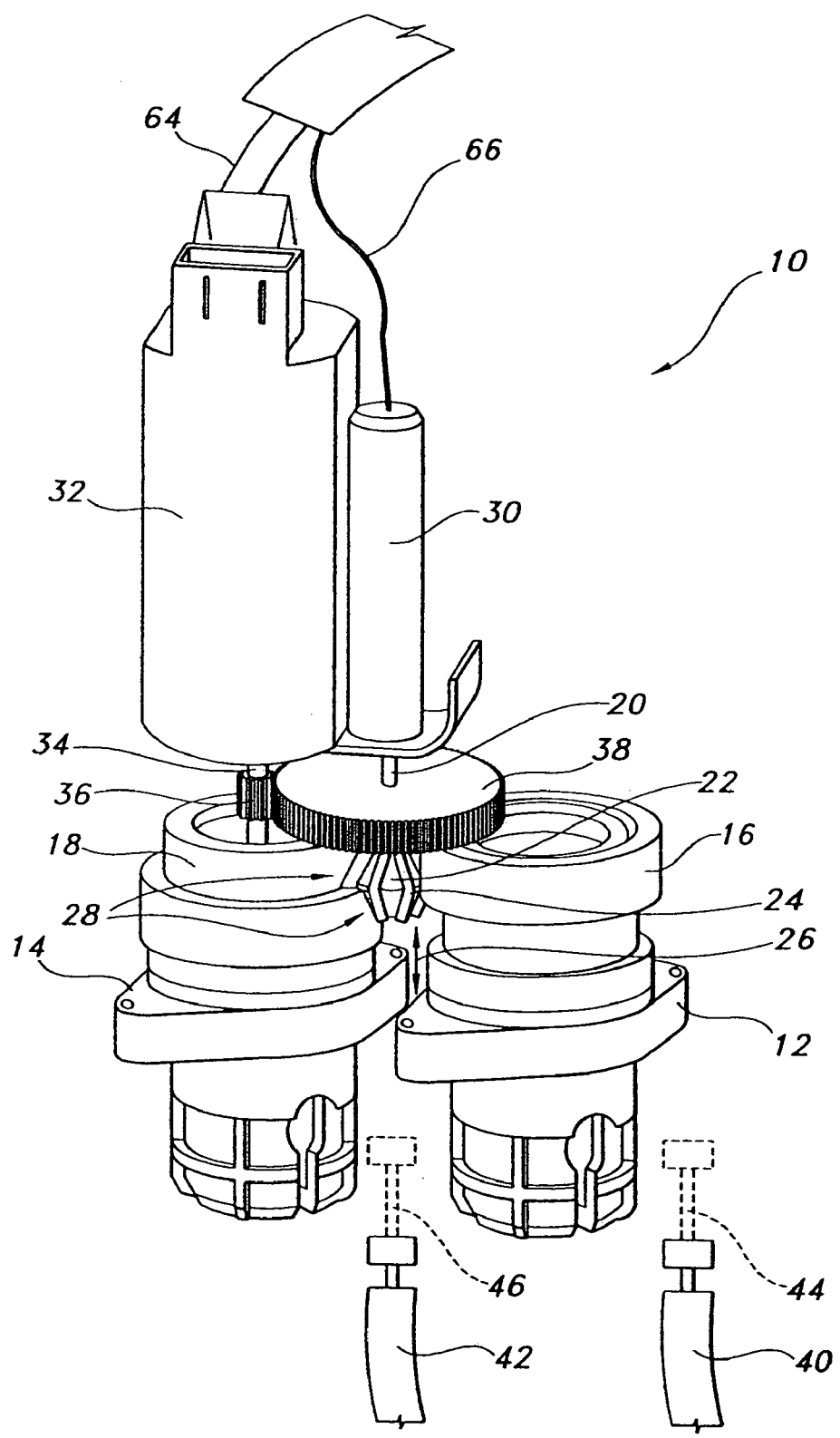
FIG. 1 illustrates the dual drive actuation system of the present invention.

Referring to the accompanying drawings in which like reference numbers indicate like elements, FIG. 1 illustrates an embodiment of the dual drive actuation system 10. In this embodiment, the dual drive 10 includes a pair of actuators 12, 14 that have a respective pair of actuated bevel gears 16, 18 and a drive shaft 20 that has a pair of driver bevel gears 22, 24. The position 26 of the drive shaft 20 is shifted to alternatively engage the actuated bevel gears 16, 18 with the driver bevel gears 22, 24. The driver bevel gears 22, 24 can be a double-sided bevel gear 28, as exemplified in FIG. 1, with the gear teeth facing away from each other in opposite directions.

Figure 5:
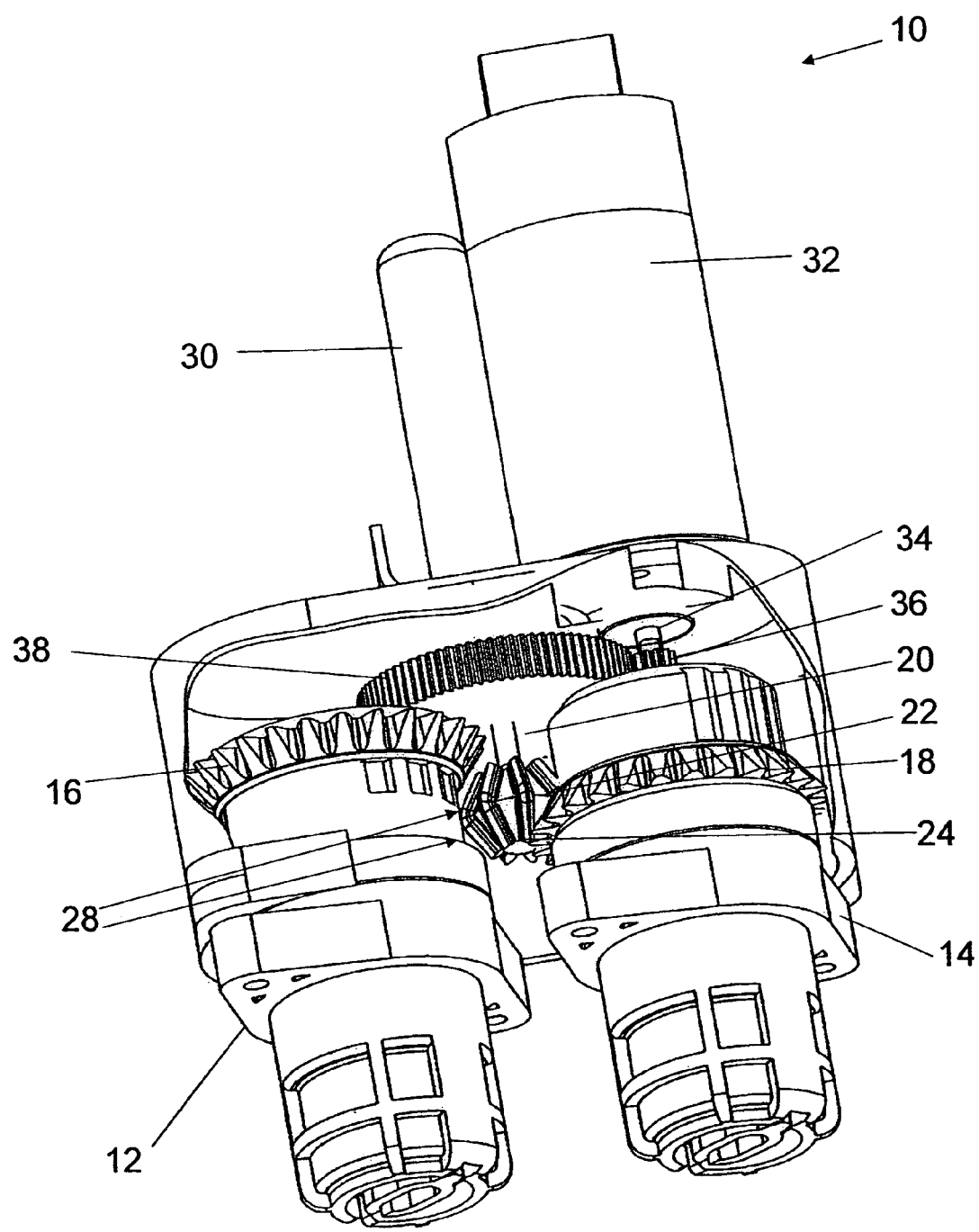
FIG. 5 illustrates the dual drive actuation system of the present invention depicting the gear arrangement and gear teeth positioning.

FIG. 5 illustrates the gear arrangement and gear teeth positioning. When the drive shaft 20 shifts towards an actuator 12, one side of the double-sided bevel gear 22 respectively engages with its corresponding actuated bevel gear 16 while the other side 24 disengages from its corresponding actuated bevel gear 18, and vice versa. The engagement of bevel gears between the actuators 12, 14 and the drive shaft 20 simplifies the gearing system because the bevel gears have opposing surfaces on the driver side and driven side. These opposing surfaces also serve as a mechanical stop to constrain the drive shaft 20 to whichever actuated bevel gear is engaged, eliminating any need for a biasing spring, retaining device, or any other stop mechanism in addition to the bevel gears themselves.

As also exemplified in FIGS. 1 and 5, a solenoid 30 or any other type of control unit or its equivalent can be used to control the position 26 of the drive shaft 20, and a motor 32 or any other type of power unit or its equivalent can be used to power the drive shaft 20. By changing the position 26 of the drive shaft 20, the solenoid 30 selectively moves the double-sided bevel gear 28 between the actuators 12, 14. The motor 32 powers a rotating shaft 34 that engages the drive shaft 20 through a set of gears, such as a pinion 36 attached to the motor's shaft 34 which meshes with a spur 38 attached to the drive shaft 20.

Figure 8:
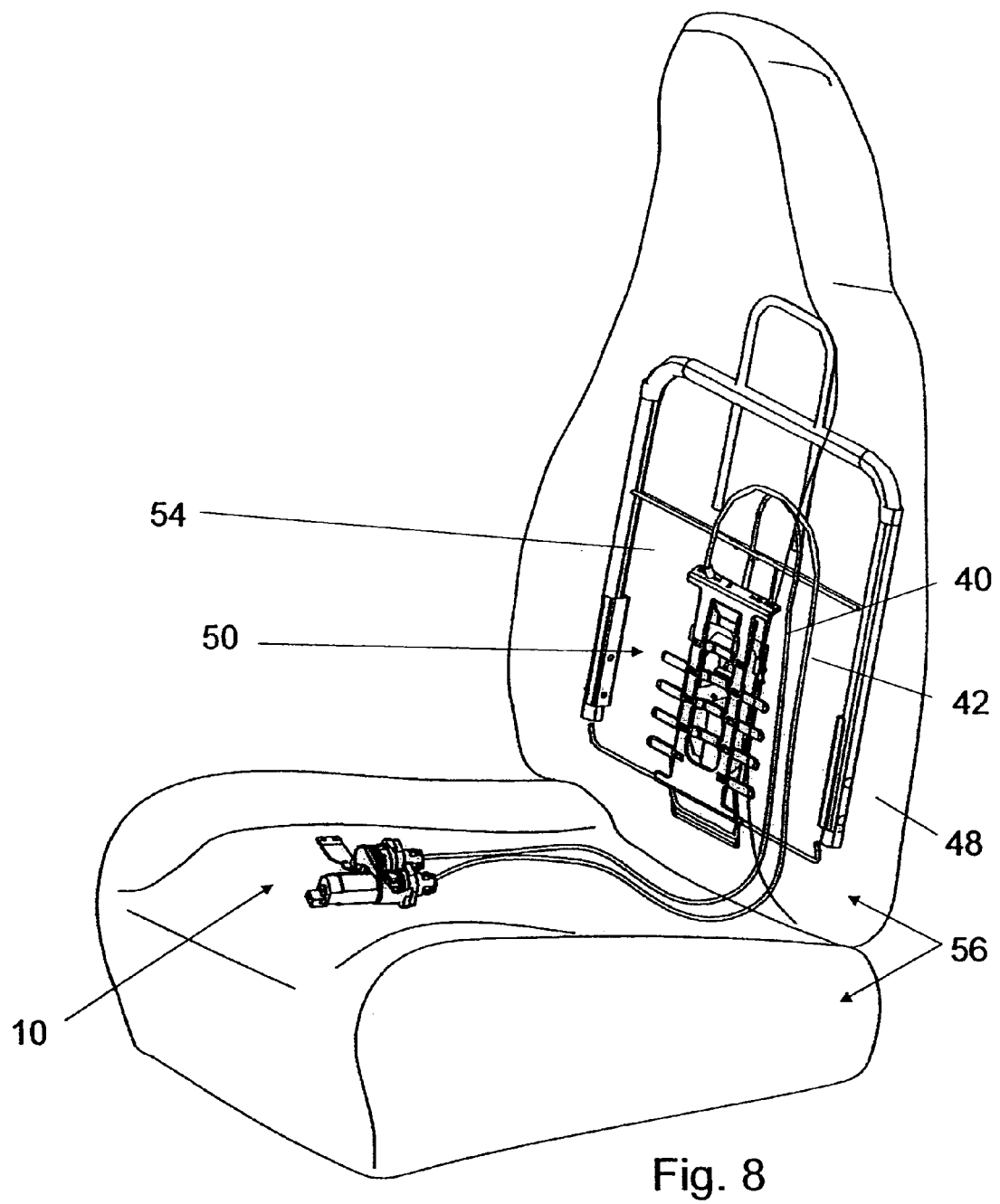
FIG. 8 illustrates the dual drive actuation system installed in a seat with a lumbar device, with the dual drive actuation device positioned in a seat back.

The actuators 12, 14 can manipulate the adjustment devices (FIGS. 2, 3, & 8) with a respective pair of bowden cables 40, 42. The dual drive actuation system 10 is modular because the actuators 12, 14 can be switched depending on the adjustment device being manipulated. For example, different types of lumbar supports are typically designed to provide different levels of support and often require different levels of actuation. Additionally, in any given four-way lumbar, it is likely that the arching mechanism requires a different level of actuation than the translation mechanism. Similarly, different types of bolster devices may also require different levels of actuation, and the level of actuation designed for a bolster device in a seat is likely to be different from the level of actuation for a lumbar device in the same seat. Even though these different adjustment devices can each have a different actuation requirement, the actuators 12, 14 can all be a part of the same family with actuated bevel gears 16, 18 that mesh with the driver bevel gears 22, 24. Accordingly, the actuators 12, 14 can be selected from this group of modular actuators that have different maximum levels of actuation but have the same actuated bevel gears 16, 18. The same actuators used for a manually-operated dual drive actuation system can also be used for a motor-driven dual drive actuation system, further increasing the commonality of parts and thereby reducing the cost of the systems.

Among the different types of actuators that can be used to manipulate seat adjustment devices are those that operate with bowden cables, such as those described in U.S. Pat. Nos. 5,638,722 and 6,053,064 and in pending U.S. application Ser. No. 10/008,896. A family of bowden cable actuators can provide a range of maximum cable travel lengths, such as 20 mm, 25 mm, 30 mm, 35 mm, 40 mm, 45 mm, and 50 mm. As discussed above, different levels of actuation could be required depending on the adjustment device being manipulated, and one actuator 12 could have one maximum cable travel length 44 while the other actuator 14 could have the same or different maximum cable travel length 46.

Figure 2:
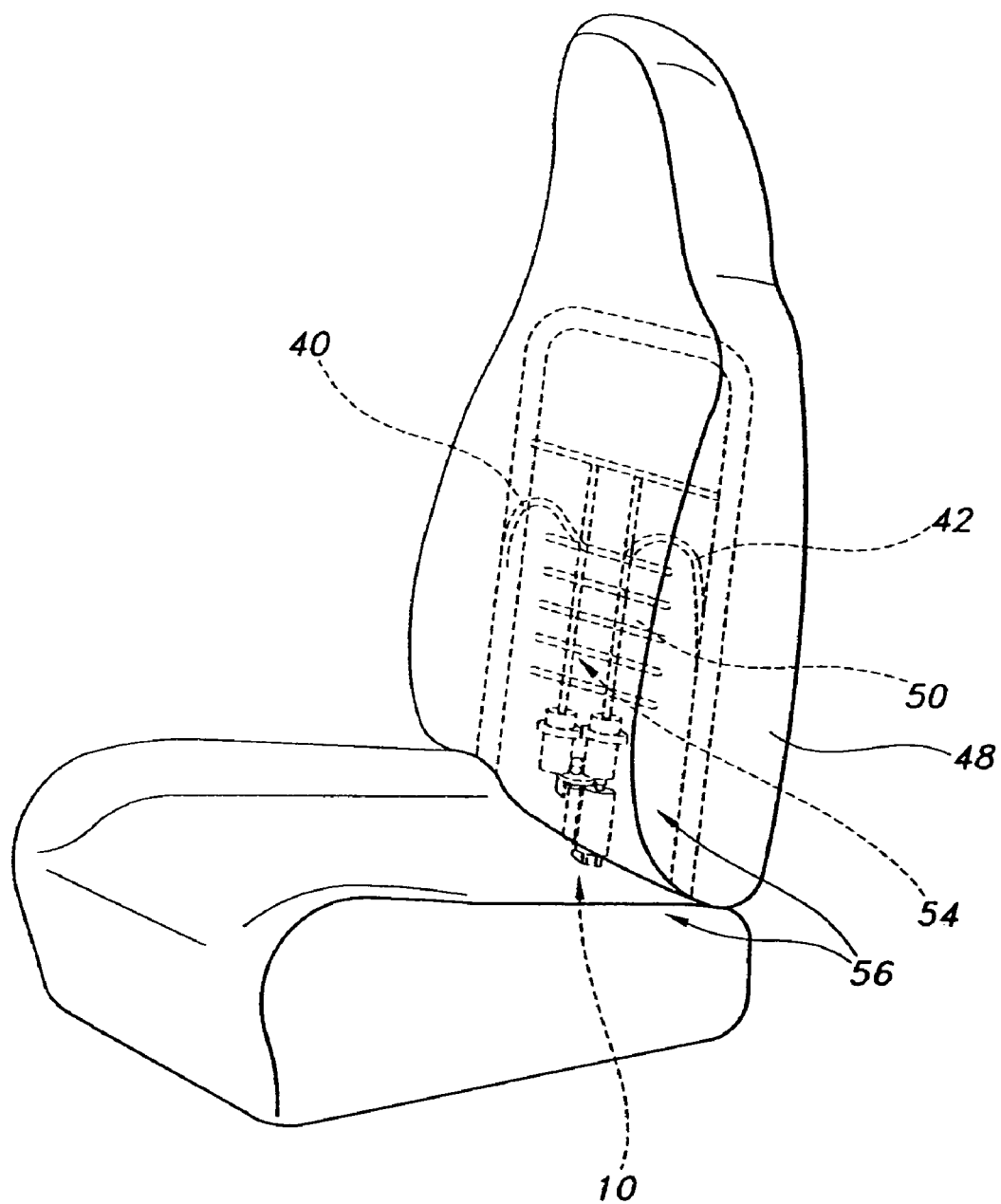
FIG. 2 illustrates the dual drive actuation system installed in a seat with a lumbar device.
Figure 3:
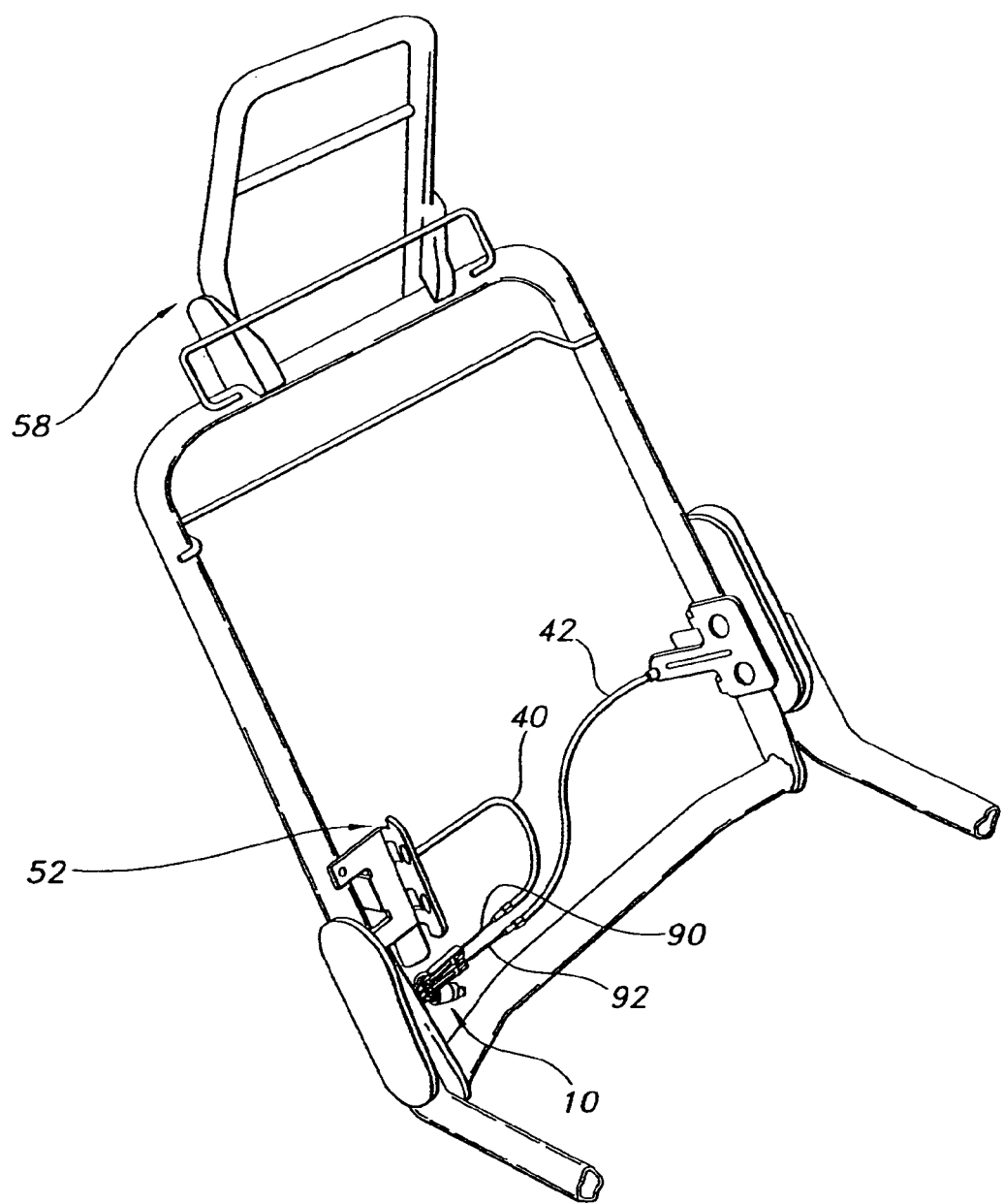
FIG. 3 illustrates the dual drive actuation system installed in a seat with a bolster device and a headrest device.

As illustrated in FIG. 2, the dual drive actuation device 10 can be installed in a seat 48 with a four-way lumbar system 50. Referring simultaneously to both FIGS. 2 and 8, one can see that the dual drive actuation device 10 may be positioned in any portion of the seat 48. Similarly, as illustrated in FIG. 3, the dual drive actuation device 10 can be installed in a seat 48 with a bolster system 52. The dual drive actuation device 10 can generally be used to manipulate the seat back 54 and seat cushions 56. The dual drive actuation device 10 can also be used to manipulate a headrest 58.

Figure 6:
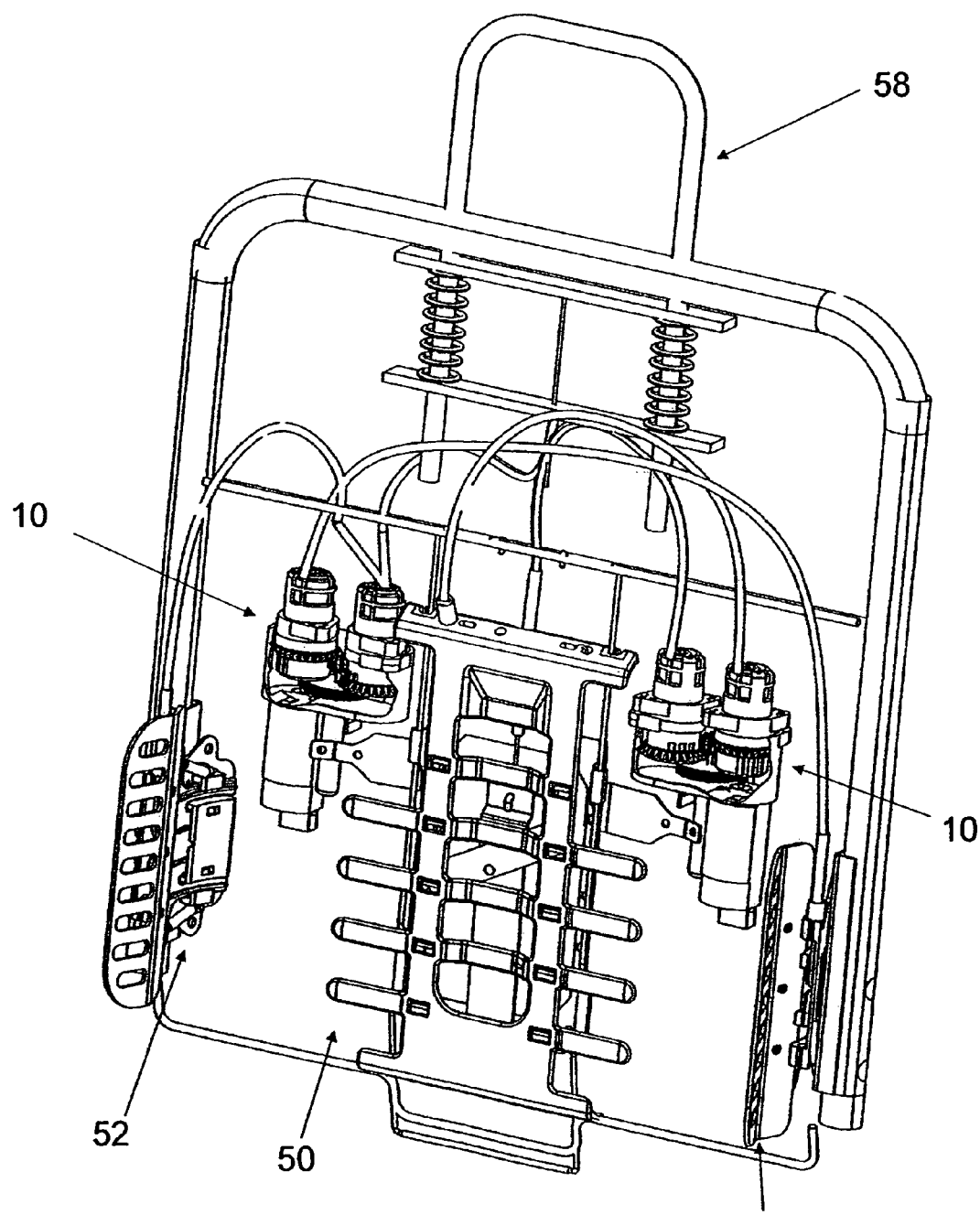
FIG. 6 illustrates the dual drive actuation system installed in a seat with the bolster device, headrest device, and a pair of dual drive actuation devices.

Another embodiment of the dual drive actuation device 10 with a bolster system is illustrated in FIG. 6. FIG. 6 shows a pair of dual drive actuation devices 10 that are used to manipulate the seat back 54 and seat cushions 56. The headrest 58, as shown in FIG. 6, has a pair of support springs. The pair of dual drive actuation devices 10 can be oriented in any position allowing user comfort, seat stability, and lumbar control.

Figure 4:
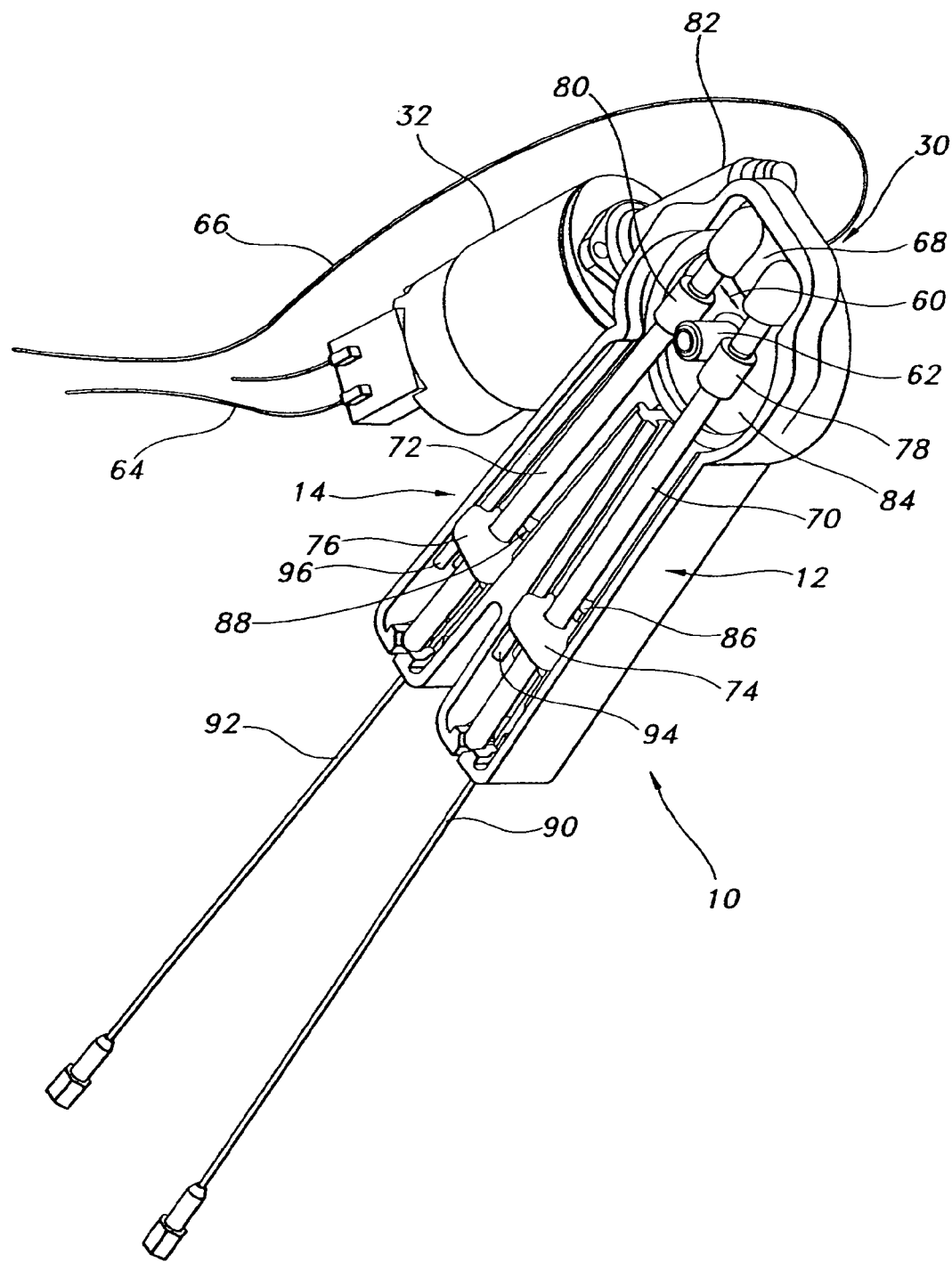
FIG. 4 illustrates the dual drive actuation system according to another embodiment of the present invention.

Another embodiment of the dual drive actuation system 10 is illustrated in FIG. 4. In the embodiment illustrated in FIG. 1, the solenoid 30 moves the position 26 of the beveled driver gear 28 to selectively engage the actuators 12, 14. In comparison, according to general aspects of the embodiment in FIG. 4, the solenoid 30 moves the position 60 of the actuators 12, 14 to selectively engage the worm driver gear 62. As illustrated by both embodiments, the power 64 for the motor 32 that drives the actuators 12, 14 can be separate from the solenoid control 66. Generally, the worm driver gear 62 and the beveled driver gear 28 form part of a drive unit which engages the motor 32 and transfers its power to the actuators 12, 14. Accordingly, the drive unit can be any type of driver gear 28, 62 or other driver unit or their equivalents that engage the motor 32 and transfers its power to the actuators 12, 14. The solenoid 30 uses a transmission system to change the positions 26, 60 and thereby switch the driving force supplied by the motor 32 to each individual actuator 12, 14. In the first embodiment, the drive shaft 20 serves as the transmission for moving the driver bevel gear 28. In the second embodiment, a pinion link 68 serves as the transmission to move the actuators 12, 14. The pinion link 68 connects one end of the actuators 12, 14 which are on either side of the worm driver gear 62. Each one of the actuators 12, 14 has a threaded rod 70, 72 in screwed engagement with a respective threaded block 74, 76. Each one of the threaded rods 70, 72 has a worm gear 78, 80.

In operation, the solenoid 30 moves the position 60 of the pinion link 68, which is connected to and moves the ends of the threaded rods 70, 72 to selectively engage the respective worm gears 78, 80 to the driver gear 62. The motor 32 has a shaft 82 that drives a spur gear 84. The driver gear 62 is attached to and rotates with the spur gear 84. Therefore, when either one of the worm gears 78, 80 is engaged with the driver gear 62, the respective threaded rod 70, 72 is rotated and the corresponding threaded block 74, 76 translates along the length of the actuator 12, 14.

The threaded blocks 74, 76 have brackets 86, 88 that can attach to the end of a cable 90, 92 or another linkage between the actuators and the seat adjustment device. The dual drive 10 illustrated in FIG. 4 provides another type of modular design for the actuators 12, 14. Of course, the actuators 12, 14 could have different lengths depending on their usage, thereby limiting the maximum extension of the cables 90, 92 that is provided by the threaded rods 70, 72. Additionally, even if the threaded rods 70, 72 have the same length, the actuators 12, 14 can provide a range of limits for the maximum extension using electronic controls. For example, the actuators 12, 14 can use the position of the threaded block 74, 76 in combination with a potentiometer or switch 94, 96 as a limit on the maximum extension.

Figure 7:
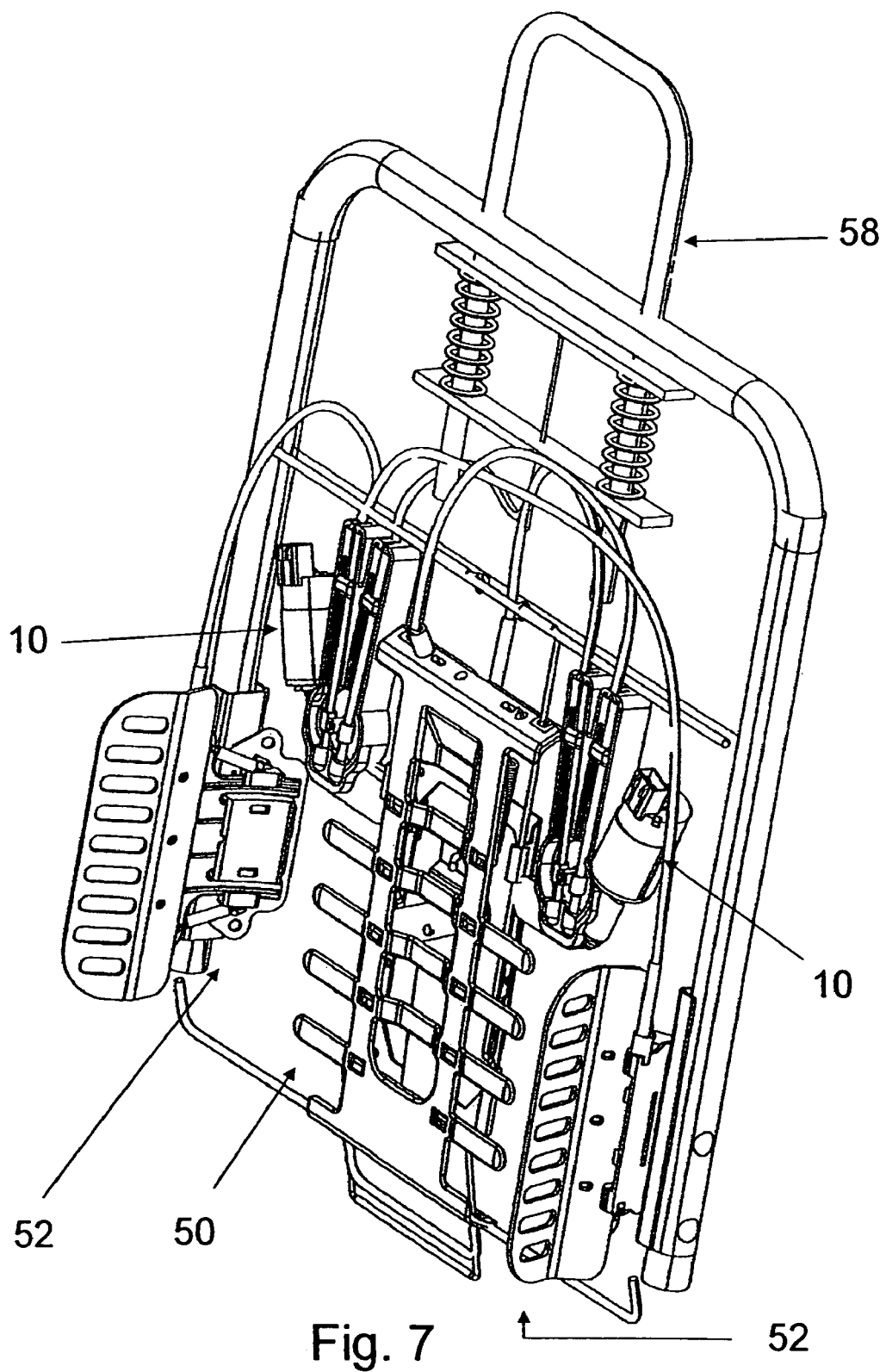
FIG. 7 illustrates the dual drive actuation system installed in a seat with the bolster device, headrest device, and a pair of dual drive actuation devices having worm driver gear arrangements.

Another embodiment using the worm driver gear arrangement of the dual drive actuation device 10 is shown in FIG. 7. FIG. 7 shows a pair of dual drive actuation devices 10 that are used to manipulate the seat back 54 and seat cushions 56. The headrest 58, as shown in FIG. 7, has a pair of support springs. The pair of dual drive actuation devices 10 can be oriented in any position allowing user comfort, seat stability, and lumbar control.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, although the drive shaft has a double-sided bevel gear attached at one end, a pair of bevel gears with opposing faces could alternatively be attached to the drive shaft. Similarly, although a solenoid is used within the control unit, a "muscle cable" or any other type of switch device or their equivalents could be used. Thus, the breadth and scope of the present invention should not be limited by any of the above-described exemplary embodiments, but should be defined only in accordance with the following claims appended hereto and their equivalents.

What is claimed is:

1. A dual drive actuation system for seat adjustments, comprising:
   a power unit;
   a drive unit operatively engaged with said power unit, said drive unit comprising a drive gear;
   a first actuator having a first driven gear;
   a second actuator having a second driven gear;
   a transmission having a first position engaging said drive unit with said first actuator and a second position engaging said drive unit with said second actuator, wherein said drive gear engages with said first driven gear and disengages from said second driven gear in said first position and wherein said drive gear disengages from said first driven gear and engages with said second driven gear in said second position and wherein said drive gear further comprises a double-sided bevel gear, said double-sided bevel gear having a first side engaging said first driven gear in said first position and having a second side engaging said second driven gear in said second position; and
   a control unit attached to said transmission, wherein said control unit moves at least a portion of said transmission between said first position and said second position.

2. The dual drive actuation system according to claim 1, further comprising a seat with at least one seat adjustment device operatively connected to said first actuator and said second actuator.

3. The dual drive actuation system according to claim 2, wherein said seat adjustment device is selected from the group of adjustment devices consisting of a seat back, a seat cushion, a lumbar, a bolster and a headrest and wherein a pair of bowden cables connect said first actuator and said second actuator to said seat adjustment device.

4. The dual drive actuation system according to claim 1, further comprising a first seat adjustment device operatively connected to said first actuator and a second seat adjustment device operatively connected to said second actuator.

5. The dual drive actuation system according to claim 1, wherein said drive gear has at least one drive surface substantially opposing at least one of said first driven gear and said second driven gear.

6. The dual drive actuation system according to claim 5, wherein a mechanical stop is defined by opposing surfaces between said drive gear and said driven gears.

7. The dual drive actuation system according to claim 1, wherein said power unit is a motor and said drive gear is selected from the group of gears consisting of a bevel gear, a double-sided bevel gear, and a worm gear.

8. The dual drive actuation system according to claim 1, wherein said control unit is a solenoid.

9. The dual drive actuation system according to claim 1, wherein said transmission further comprises a drive shaft connecting said drive unit with said control unit.

10. The dual drive actuation system according to claim 1, further comprising:
    a rotating shaft extending from said motor;
    a pinion attached to said rotating shaft; and
    a spur gear attached to said drive shaft and engaged with said pinion.

11. A dual drive actuation system for seat adjustments, comprising:
    a power unit;
    a first actuator having a first gear;
    a second actuator having a second gear;
    a driver unit engaged with said power unit, said driver unit comprising a drive gear;
    a control unit having a first position and a second position, wherein said first position engages said first gear with said drive gear and disengages said second gear from said drive gear and wherein said second position disengages said first gear from said drive gear and engages said second gear with said drive gear, wherein said control unit is operatively connected to said driver unit and said driver unit further comprises a drive shaft and a double-sided bevel gear, wherein a first side of said double-sided bevel gear engages said first driven bevel gear in said first position and a second side of said double-sided bevel gear engages said second driven bevel gear in said second position; and
    a seat with at least one seat adjustment device operatively connected to said first actuator and said second actuator.

12. The dual drive actuation system according to claim 11, wherein said control unit is operatively connected to said first actuator and to said second actuator.

13. A dual drive actuation system for seat adjustments, comprising:
    a motor with a rotating shaft and a pinion attached to said rotating shaft,
    a first actuator with a first driven gear;
    a second actuator with a second driven gear;
    a drive shaft having a spur in geared engagement with said motor through said pinion, said drive shaft having a first position and a second position, wherein said first position is in geared engagement with said first actuator and disengaged from said second actuator and wherein said second position is in geared engagement with said second actuator and disengaged from said first actuator; and
    a solenoid operatively connected to said drive shaft wherein said solenoid moves said drive shaft between said first position and said second position.

14. The dual drive actuation system according to claim 13, further comprising a seat with at least one seat adjustment device operatively connected to said first actuator and said second actuator.

15. The dual drive actuation system according to claim 13, wherein said first driven gear and said second driven gear are a pair of bevel gears and wherein said drive shaft further comprises a double-sided bevel gear selectively engaging one of said pair of bevel gears in said first position and another of said pair of bevel gears in said second position.

16. A dual drive actuation system, comprising:
 a first actuator,
 a second actuator,
 a first driven bevel gear connected to said first actuator;
 a second driven bevel gear connected to said second actuator;
 a drive shaft having a first position and a second position;
 a first driver bevel gear connected to said drive shaft, wherein said first driver bevel gear engages said first driven bevel gear in said first position, wherein said first driver bevel gear disengages from said first driven bevel gear in said second position; and
 a second driver bevel gear connected to said drive shaft, wherein said second driver bevel gear engages said second driven bevel gear in said second position, wherein said second driver bevel gear disengages from said second driven bevel gear in said first position and wherein said first driver bevel gear and said second diver bevel gear are opposite sides of a doubled-sided bevel gear.

17. The dual drive actuation system according to claim 16, wherein said first driver bevel gear faces a first direction and said second driver bevel gear faces a second direction.

18. The dual drive actuation system according to claim 16, further comprising a solenoid operatively connected to said drive shaft, wherein said solenoid moves said drive shaft between said first position and said second position.

19. The dual drive actuation system according to claim 18, further comprising a motor in geared engagement with said drive shaft.

20. The dual drive actuation system according to claim 16, further comprising a seat with at least one seat adjustment device operatively connected to said first actuator and said second actuator.

* * * * *

UNITED STATES PATENT AND TRADEMARK OFFICE
CERTIFICATE OF CORRECTION

PATENT NO. : 6,983,990 B2
DATED : January 10, 2006
INVENTOR(S) : McMillen

It is certified that error appears in the above-identified patent and that said Letters Patent is hereby corrected as shown below:

Column 8,
Line 3, reads "diver bevel gear are opposite…" should read -- driver bevel gear are opposite --.

Signed and Sealed this

Twenty-first Day of March, 2006

JON W. DUDAS
*Director of the United States Patent and Trademark Office*